(12) United States Patent
Luneau et al.

(10) Patent No.: US 8,670,039 B2
(45) Date of Patent: Mar. 11, 2014

(54) METHOD AND SYSTEM FOR TESTING AN IMAGE STABILIZING DEVICE FOR AN IMAGE CAPTURE APPARATUS

(75) Inventors: Dominique Luneau, Chilly (FR); Paul Varillon, Grenoble (FR); Remi Serve, Tassin la Demi-Lune (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 570 days.

(21) Appl. No.: 13/015,386

(22) Filed: Jan. 27, 2011

(65) Prior Publication Data

US 2011/0181741 A1     Jul. 28, 2011

(30) Foreign Application Priority Data

Jan. 28, 2010   (FR) ..................................... 10 00320

(51) Int. Cl.
*H04N 5/228*     (2006.01)
*G01M 7/00*     (2006.01)

(52) U.S. Cl.
USPC ......................................... 348/208.4; 73/662

(58) Field of Classification Search
USPC ............... 348/208.99–208.14, 373, 374, 375; 73/662, 663, 667–668
See application file for complete search history.

(56) References Cited

U.S. PATENT DOCUMENTS

| | | | |
|---|---|---|---|
| 5,665,919 A | 9/1997 | Woyski et al. | |
| 5,771,406 A | 6/1998 | Sakamoto et al. | |
| 7,013,731 B1 | 3/2006 | Szeremeta et al. | |
| 8,100,017 B1 * | 1/2012 | Blick et al. | 73/666 |
| 8,408,066 B1 * | 4/2013 | Romero et al. | 73/663 |
| 2003/0109992 A1 | 6/2003 | Horiuchi et al. | |
| 2004/0039760 A1 | 2/2004 | Hess et al. | |
| 2010/0014846 A1 | 1/2010 | Nishi et al. | |
| 2012/0111120 A1 * | 5/2012 | Brand et al. | 73/662 |

FOREIGN PATENT DOCUMENTS

GB    2 135 063 A    8/1984

* cited by examiner

*Primary Examiner* — Aung S Moe
(74) *Attorney, Agent, or Firm* — Seed IP Law Group PLLC

(57) ABSTRACT

The disclosure relates to a test process of an image stabilization system in an image capture apparatus, comprising steps of: submitting the stabilization system to rotation vibratory movements around two distinct rotation axes, measuring characteristics of rotation vibratory movements, and setting the rotation vibratory movements to setpoint position values and, taking into consideration the measured characteristics of the vibratory movements, collecting images from the image capture apparatus submitted to vibration and analyzing the collected images.

21 Claims, 3 Drawing Sheets

METHOD AND SYSTEM FOR TESTING AN IMAGE STABILIZING DEVICE FOR AN IMAGE CAPTURE APPARATUS

BACKGROUND

1. Technical Field

The present disclosure relates to performance tests of a system compensating trembling movements of which the human body and in particular the hands are afflicted, during operations benefiting from an object being held as still as possible or with a precision as high as possible.

2. Description of the Related Art

Certain image capture apparatus, such as photography apparatus and digital cameras, are equipped with such a system to compensate for trembling movements during the holding of the apparatus, and thus improve the sharpness of blurry images during the capture of an image. These trembling movements are that much greater when the apparatus is light and can be held with a single hand.

Human trembling movements consist of involuntary vibratory movements that are cumulated with voluntary movements. These vibratory movements generally present amplitudes of several tens of millimeters to several millimeters, and can comprise several harmonics from 0.1 Hz to 20 Hz, as well as presenting angular speeds of about 2°/s and/or linear speeds of about 2 mm/s.

Therefore, electromechanical image stabilization systems exist that comprise acceleration and rotational speed sensors to measure trembling movements, as well as actuators to compensate these movements by displacing optical elements or the image sensor of the image capture apparatus. Due to their higher prices and their large bulk, these systems are usually used with high-range and voluminous photo apparatus, such as reflex cameras.

For lower-range apparatus such as "compact" photographic apparatus and those installed on mobile telephones, image stabilization algorithms have been devised that aim to correct the blurry effect in the captured images. This effect results from trembling movements while the apparatus was held. Certain image stabilization systems are based on a detection of the trembling movements. In some systems, the detection of trembling movements is done with the aid of sensors, and in other systems, it is done by the comparison of successive images. Based on the detected trembling movements, image stabilization algorithms apply a correction to the image that aims to limit or negate the blurry effect. Other image stabilization algorithms consist of using an image taken at the required speed and an image taken at a higher speed to produce a corrected image.

A need exists for a performance test of such image stabilization or correction systems, with the aim of development, characterization, and comparison of different existing image stabilization systems. To this end, these systems may be tested by several people. Nevertheless, such tests turn out to be insufficient due to the difficulty of selecting an adequately representative sample of people to obtain conclusive results. Another problem is test reproducibility, in particular to perform comparisons. Indeed, it is impossible for a person to reproduce exactly the same trembling movement, which is involuntary by nature.

Automated systems exist that allow the displacements and the spatial position of an object to be controlled. These systems turn out, in general, to be incapable of generating amplitude and frequency controlled vibrations with a sufficient precision to simulate, in a reproducible manner, human trembling movements, in particular due to a too high inertia and/or response time. In particular, these systems cannot generate frequency vibrations greater than 10 Hz, whereas a human tremble can reach a frequency of 20 Hz. These systems are also incapable of reproducing a vibratory movement combining several frequencies and amplitudes. Moreover, certain systems with an automated arm need to be within a secure enclosure, which is incompatible with the holding of an image capture apparatus that needs to be directed towards a scene in order to perform stabilization tests of the imaging system.

It may therefore be desirable to use a performance test device of an image stabilization system, in particular for an image capture apparatus, that is capable of reproducing one or more combined human trembling movements, with a sufficient precision of both frequency and amplitude.

BRIEF SUMMARY

Embodiments of the disclosure relate to . . . .

BRIEF DESCRIPTION OF THE SEVERAL VIEWS OF THE DRAWINGS

Embodiment examples of the disclosure will be described in the following, in a non-limiting manner in relation with the appended drawings among which.

DETAILED DESCRIPTION

Figure 1:
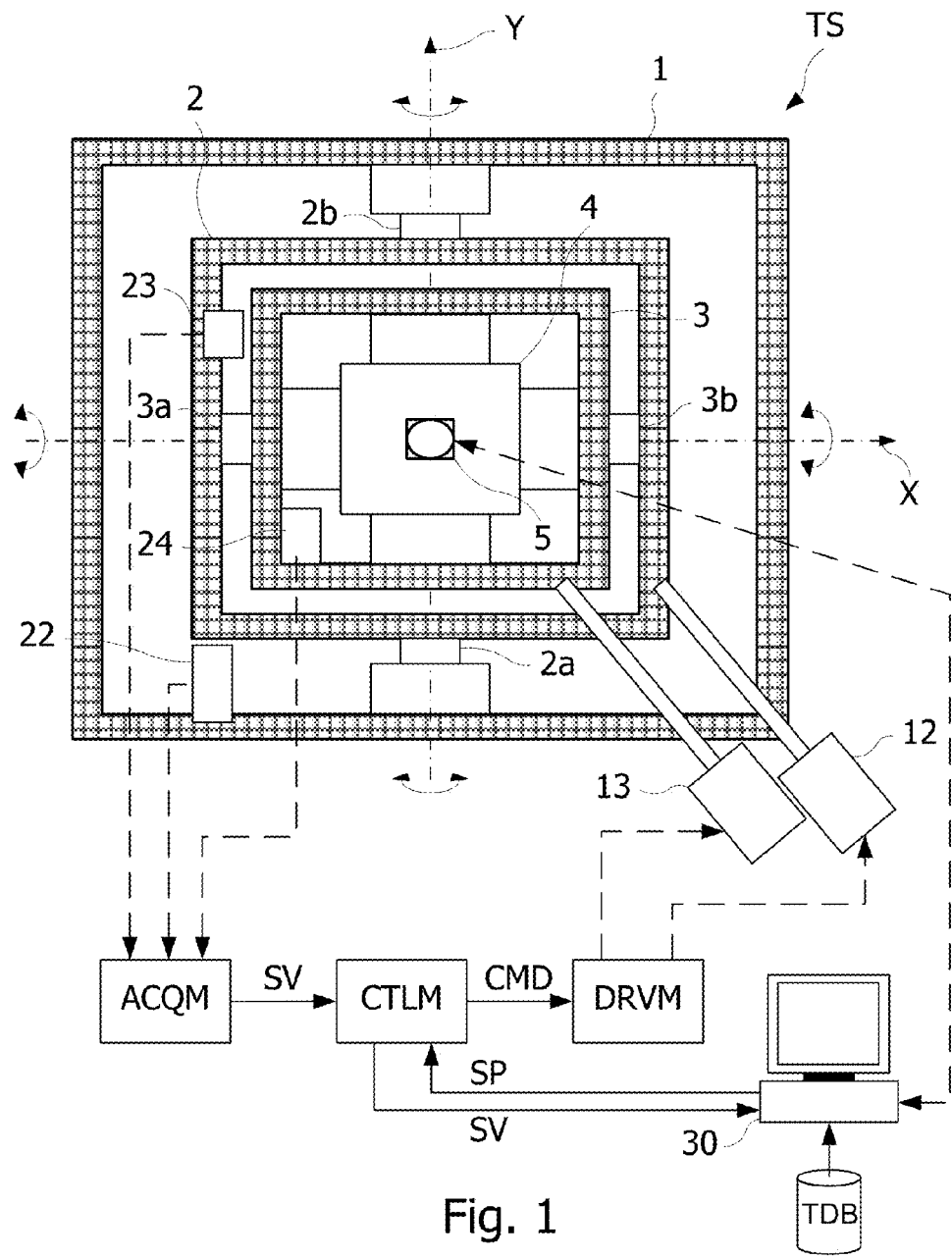
FIG. 1 schematically shows a performance test device of an image stabilization system of an image capture apparatus, according to one embodiment, FIG. 2 schematically shows a performance test device of an image stabilization system of an image capture apparatus, according to another embodiment.

FIG. 1 shows a performance test device of an image stabilization system, in particular of an image capture apparatus, according to one embodiment. The test device comprises a vibrating mechanical ensemble TS mechanically coupled to actuators 12, 13, and sensors 22, 23, 24. The signals sent by sensors 22, 23, 24 are transmitted to an acquisition module ACQM. The module ACQM shapes the received signals and transmits the shaped signals SV to a control module CTLM. The module CTLM develops the command values CMD to apply to actuators 12, 13 as a function of signals SV and setpoint values SP. The values CMD are transmitted to a command module DRVM that converts the values CMD to electrical signals able to command the actuators 12, 13. The setpoint values SP are supplied to the module CTLM by a processor 30, for example a personal computer (PC).

The mechanical ensemble TS comprises a fixed support 1, and mobile supports 2, 3 that are moveable with respect to the support 1. The mobile support 2 is movably mounted in rotation around an axis Y with respect to the fixed support 1. In the example of FIG. 1, the axis Y is vertical. The mobile support 3 is movably mounted in rotation with respect to mobile support 2 around an axis X distinct from the axis Y, for example substantially perpendicular to the axis Y. In the example of FIG. 1, the axis X is mobile in a horizontal plane. The support 2 comprises for example two coaxial shafts 2a, 2b maintained in bearings formed in the support 1. Similarly, the support 3 comprises for example two coaxial shafts 3a, 3b maintained in bearings formed in the support 2.

The angular position of the mobile support 2 around the axis Y is controlled by the actuator 12, and the angular position of the mobile support 3 around the axis X is controlled by the actuator 13. Moreover, the sensors 22 and 23 each supply an instantaneous position signal allowing the angular position of the supports 2, 3 around their respective rotation axes Y, X to be determined. The group of sensors 24 supplies instantaneous angular speed signals of the supports 2, 3 around their respective axes Y, X. The mobile support 3 is configured to support an image capture apparatus 5 and comprises, to this end, a holder 4 configured to grasp and force the image capture apparatus to move in concert with the mobile support 3.

In the example of FIG. 1, the supports 1, 2, 3 have the form of frames, but can evidently have other forms such as the form of a U, with two branches connected by a base, the extremities of the two branches supporting the support bearings of shafts 2a, 2b, 3a, 3b.

The sensors 22, 23 are for example linear potentiometers supplying a linear displacement value, allowing an angular displacement value of the mobile supports 2, 3 to be deduced from the distance between the measurement point supplied by the sensor and the rotation axis X or Y. The group of sensors 24 comprises for example gyrometers supplying an angular speed value for each rotation axis X, Y. The actuators 12, 13 can be of the linear electrodynamic actuator type, for example of the "Voice Coil Actuator" type, with the advantage of a rapid and precise positioning.

The group of modules ACQM, CTLM, DRVM, of actuators 12, 13, and of sensors 22, 23, 24 forms a control loop wherein the movements of mobile supports 2, 3 are controlled to follow respective variation curves of the angular position. The control can thus be done in such a manner so as to obtain a precision error of less than 0.01° in the positioning of the mobile supports 2, 3, around their rotation axes X, Y. The frequency of the closed control loop, that is to say, the frequency at which the measurement signals SV are supplied by the module ACQM and at which the command signals CMD are supplied by the module CTLM, can be on the order of 100 to 200 times the rate at which the setpoint values SP are supplied by the processor 30. For example, the processor 30 supplies a setpoint position value SP approximately every 10 ms to each actuator 12, 13, whereas the module CTLM calculates a command value CMD every 62.5 µs to each actuator 12, 13. If the vibratory movement to reproduce has a frequency less than or equal to 20 Hz, the processor 30 therefore supplies at least 5 setpoint values SP per vibration period to simulate, which allows for the reproduction of a vibratory movement, such as sinusoidal, with a sufficient precision.

The module CTLM may also be configured to transmit all the position and speed measurements received from the module ACQM to the processor 30. In this manner, using the processor 30, the user can control with what precision each of the movements applied to the mobile supports 2, 3 follows a variation curve of setpoint values.

The processor 30 is configured to allow the user to introduce, for each rotation axis X, Y, characteristics of a vibratory movement, such as one or more vibration frequencies to combine and a movement amplitude for each frequency. From these characteristics, the processor 30 determines position values separated by a certain period, for example 10 ms, of the support 2, 3. The processor 30 can also be configured to receive, for example in a file, sets of position values of the support 2, 3. As an example, these values may be from a measurement, performed upon a person, of trembling movements.

The processor 30 may also be configured to launch image capture operations by the image capture apparatus 5 fixed to the test device, at moments chosen with respect to vibratory movements applied to the supports 2, 3. The image capture operations have chosen characteristics, such as the focus speed, opening, and sensitivity (ISO). The images taken by the apparatus 5 may be transmitted to the processor 30, which stores them. The processor 30 can then analyze the transmitted images to evaluate a blur level and to correlate the blur level obtained with the vibratory movement applied to the image capture apparatus by the test device, during the capture of an image.

Figure 2:
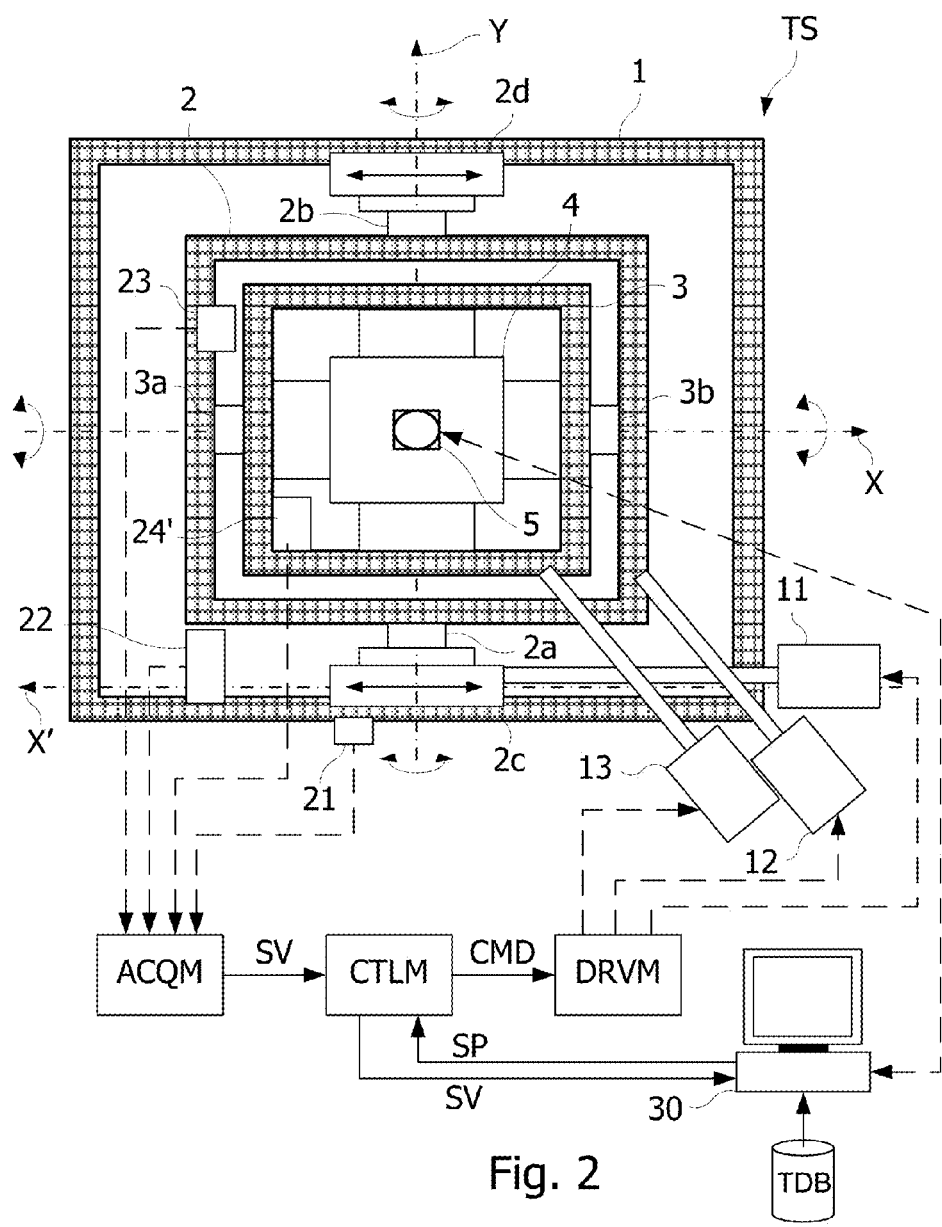

According to one embodiment shown by FIG. 2, the support 2 is also movably mounted in translation with respect to support 1. Thus, FIG. 2 shows a performance test device of an image stabilization system in an image capture apparatus. The test device of FIG. 2 differs from that of FIG. 1 in that the support 2 is also movably mounted in translation with respect to support 1, for example along an axis X' perpendicular to the axis Y in the plane of the support 1 (or parallel to the axis X when the support 2 is in the plane of the support 1). To this end, the bearings that maintain the shafts 2a, 2b are for example formed in carriers 2c, 2d slidably mounted on the support 1 forming rails. The position of support 2 in the plane of support 1 is commanded by an actuator 11 controlled by the module DRVM and measured by a sensor 21 connected to the module ACQM and supplying an instantaneous position value. The group of sensors 24 is replaced by a group of sensors 24' that differs from the group 24 in that it further comprises a linear acceleration sensor along the translation axis X' of the support 2 with respect to support 1. This sensor supplies an instantaneous linear acceleration value of the support 2. The modules ACQM, CTLM, DRVM and the processor 30 are therefore configured also to ensure the control of translation movements of the support 2 with respect to support 1.

The modules ACQM, CTLM, and DRVM are for example made from product commercialized by the company NATIONAL INSTRUMENTS. Thus, the module ACQM is for example made from a chassis PXI-1033 incorporating a 6-axis card PXI-7356 and a continuous power supply card PXI-4110. The module DRVM is for example a 4-axis power motor drive MID-7654. The module CTLM can be made with the aid of a PXI-PCIe8361 card, which can be connected to an internal bus PCI of a computer of the PC type. The setpoints SP may be designated with the help of a program installed in the processor 30, such as the program LabView, also commercialized by the company NATIONAL INSTRUMENTS. The test device may thus generate vibrations that may reach a frequency of 20 Hz and an amplitude of 2°.

Figure 3:
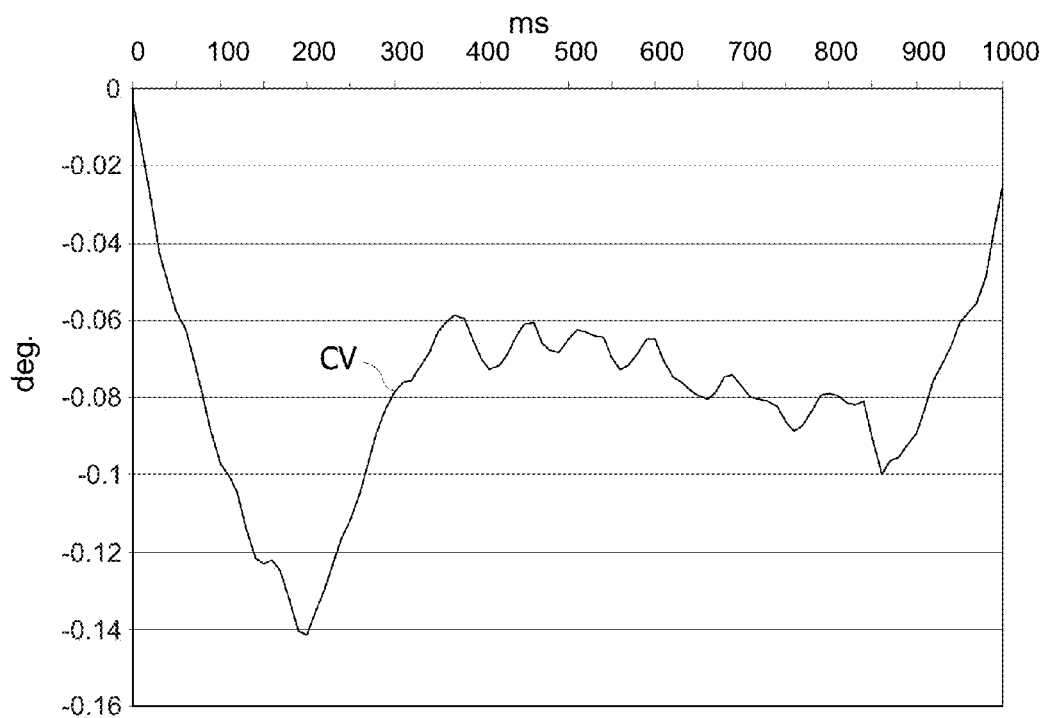
FIG. 3 is a curve of rotation movements applied by the test device on one or two rotation or translation axes.

The test device that has just been described allows for the reproduction of complex vibratory movements, such as that shown in FIG. 3. FIG. 3 shows a curve CV of rotation movements applied around one or both rotation axes X, Y and/or translation movements along the translation axis X' of the test device. The curve CV comprises 1000 points corresponding to 1000 angular position values expressed in degrees, which are successively sent every 10 ms by the processor 30 to the module CTLM. The precision of 0.01° conferred by the control allows a vibratory movement to be obtained that is close to the vibratory movement corresponding to the curve CV.

Figure 4:
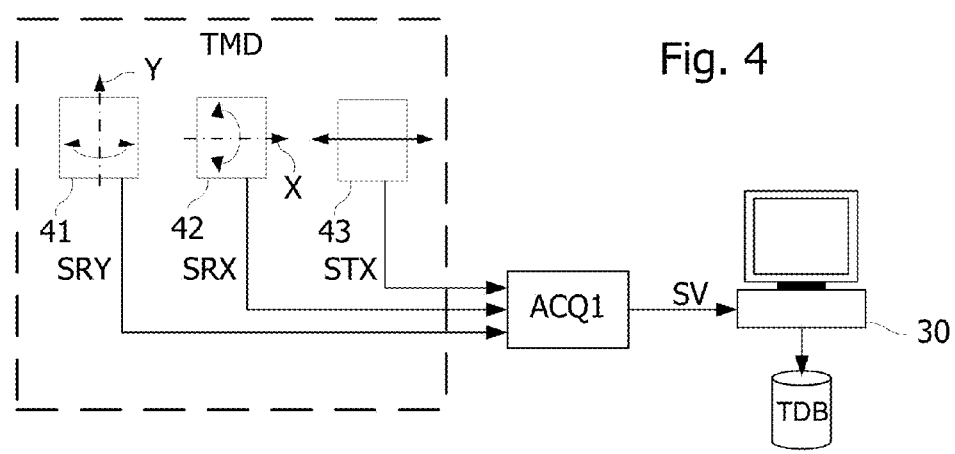
FIG. 4 shows schematically a measurement and storage device of human trembling movements, according to one embodiment.

An embodiment also relates to a device that allows for the detection and storing of a human vibratory movement, in rotation around the two distinct axes that may be perpendicular, and possibly translated in a direction perpendicular to one of these two axes. Thus, FIG. 4 shows a device for detecting a vibratory movement that is configured to be hand-held, such as an image capture apparatus. The detection device TMD comprises two gyrometers 41, 42. The gyrometer 41 supplies a signal SRY proportional to a rotational speed of the device TMD around an axis Y, for example substantially vertical. The gyrometer 42 supplies a signal SRX proportional to a rotational speed of the device TMD around an axis X distinct from the axis Y, for example perpendicular to the axis Y or in a horizontal plane. The signals SRX and SRY are transmitted to an acquisition module ACQ1 that shapes the signals and transmits them to a storage device, for example that is part of the PC computer 30. The device TMD is for example similar to the group of sensors 24 described in reference to FIG. 1. The module ACQ1 comprises for example the angular speed signal processing circuits of the module ACQM. The module ACQ1 supplies periodically, for example every 10 ms, angular speed measurements to the computer, which saves them. The computer deduces, by an integral calculation, angular position values that can then be saved in a file TDB. The file may be supplied to the test device of FIG. 1, and the values of this file are supplied by the processor 30 as setpoint values SP to the control module CTLM.

According to one embodiment, the device TMD also comprises an acceleration sensor 43 that supplies a signal STX proportional to an acceleration of the device TMD along the direction X. The signal STX is also processed by the module ACQ1 that supplies periodically, for example every 10 ms, an acceleration measurement to the computer. These measurements allow an integral calculation to determine position values that may be saved in the file TDB, in order to be supplied as setpoint values SP to the test device of FIG. 2.

It will clearly appear to the skilled person that the present disclosure is susceptible to various other embodiments and applications. In particular, the disclosure does not only apply to image capture apparatus, but may also be applied to any device that may be equipped with a system aiming to compensate for human trembling movements while an object is being held by one or both hands.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A test process for testing a stabilization system for compensating human trembling movements, comprising:
   submitting the stabilization system to rotation vibratory movements around two distinct rotation axes;
   measuring characteristics of the rotation vibratory movements; and
   slaving the rotation vibratory movements of the stabilization system to setpoint position values based on the measured characteristics of the rotation vibratory movements.

2. A process according to claim 1, comprising:
   submitting the stabilization system to translation vibratory movement along a translation axis substantially perpendicular to one of the two rotation axes;
   measuring characteristics of the translation vibratory movement applied to the stabilization system; and
   slaving the translation vibratory movement of the stabilization system to setpoint position values based on the measured characteristics of the translation vibratory movement.

3. A process according to claim 2, wherein the measured characteristics of the translation vibratory movement comprise instantaneous linear positions and accelerations.

4. A process according to claim 1, wherein the rotation vibratory movement around a rotation axis is applied to the stabilization system in a manner independent of other vibratory movements applied to the stabilization system.

5. A process according to claim 1, wherein the measured characteristics of rotation vibratory movements comprise instantaneous angular positions and angular speeds around the rotation axes.

6. A process according to claim 1, wherein the submitting includes applying commands to actuators and generating the rotation vibratory movements by the actuators in response to the commands, wherein the measuring and applying are performed at a rate of 100 to 200 times a rate at which the setpoint position values are supplied.

7. A process according to claim 1, comprising a comparing measured position values and setpoint position values.

8. A process according to claim 1, wherein the stabilization system is equipped with an image capture apparatus and the rotation vibratory movements are applied to the image capture apparatus, the process comprising collecting images from the image capture apparatus submitted to rotation vibratory movements, and determining performances of the stabilization system by analyzing the collected images.

9. A process according to claim 1, comprising
   measuring characteristics of rotation vibratory movements around the two distinct rotation axes of an object held by a human,
   determining successive positions of the object around the rotation axes as a function of the measured characteristics of the object, and
   storing the determined successive positions.

10. A process according to claim 1, comprising:
    measuring characteristics of a translation vibratory movement of an object, held by a human, along a translation axis parallel to one of the two rotation axes;
    determining successive positions along the translation axis as a function of the measured movements; and
    storing the determined successive positions.

11. A process according to claim 10, comprising supplying stored successive positions as the setpoint position values.

12. A process according to claim 1, comprising determining the setpoint position values as a function of amplitude and frequency values of one or more combined vibratory movements.

13. A test device for testing a stabilization system configured to compensate for human trembling movements, comprising:
    a plurality of actuators configured to submit the stabilization system to rotation vibratory movements around two distinct rotation axes;
    a measuring system configured to measure characteristics of the rotation vibratory movements; and
    a controller configured to slave the rotation vibratory movements of the stabilization system to setpoint position values based on the measured characteristics of the rotation vibratory movements.

14. A device according to claim 13, wherein the actuators are voice coil actuators.

15. A device according to claim 13, wherein the measuring system includes linear potentiometers configured to measure a position of a support of the stabilization system around the rotation axes, and gyrometers configured to measure instantaneous angular speeds of the stabilization system around the rotation axes.

16. A device according to claim 13, comprising:
a fixed first support,
a second support rotatably coupled to the first support,
a third support rotatably coupled to the second support and configured to receive an image capture apparatus, the second support being configured to slide laterally with respect to the first support.

17. A device according to claim 13, comprising:
an image capture apparatus;
a fixed first support,
a second support rotatably coupled to the first support,
a third support rotatably coupled to the second support and configured to receive the image capture apparatus.

18. A system, comprising:
an image capture apparatus holder configured to hold an image capture apparatus;
a plurality of actuators configured to submit the image capture apparatus holder to rotation vibratory movements around two distinct rotation axes;
a measuring system configured to measure characteristics of the rotation vibratory movements; and
a controller configured to slave the rotation vibratory movements of the stabilization system to setpoint position values based on the measured characteristics of the rotation vibratory movements.

19. A system according to claim 18, wherein the measuring system includes linear potentiometers configured to measure a position of a support of the stabilization system around the rotation axes, and gyrometers configured to measure instantaneous angular speeds of the stabilization system around the rotation axes.

20. A system according to claim 18, comprising:
a fixed first support,
a second support rotatably coupled to the first support,
a third support rotatably coupled to the second support and including the image capture apparatus holder.

21. A system according to claim 18, comprising:
a fixed first support,
a second support rotatably coupled to the first support,
a third support rotatably coupled to the second support and configured to receive an image capture apparatus, the second support being configured to slide laterally with respect to the first support.

* * * * *